J. A. LEWIS.
DEVICE FOR REMOVING RINGS FROM GLASSWARE.
APPLICATION FILED JAN. 9, 1918.
1,272,971.
Patented July 16, 1918.
2 SHEETS—SHEET 1.
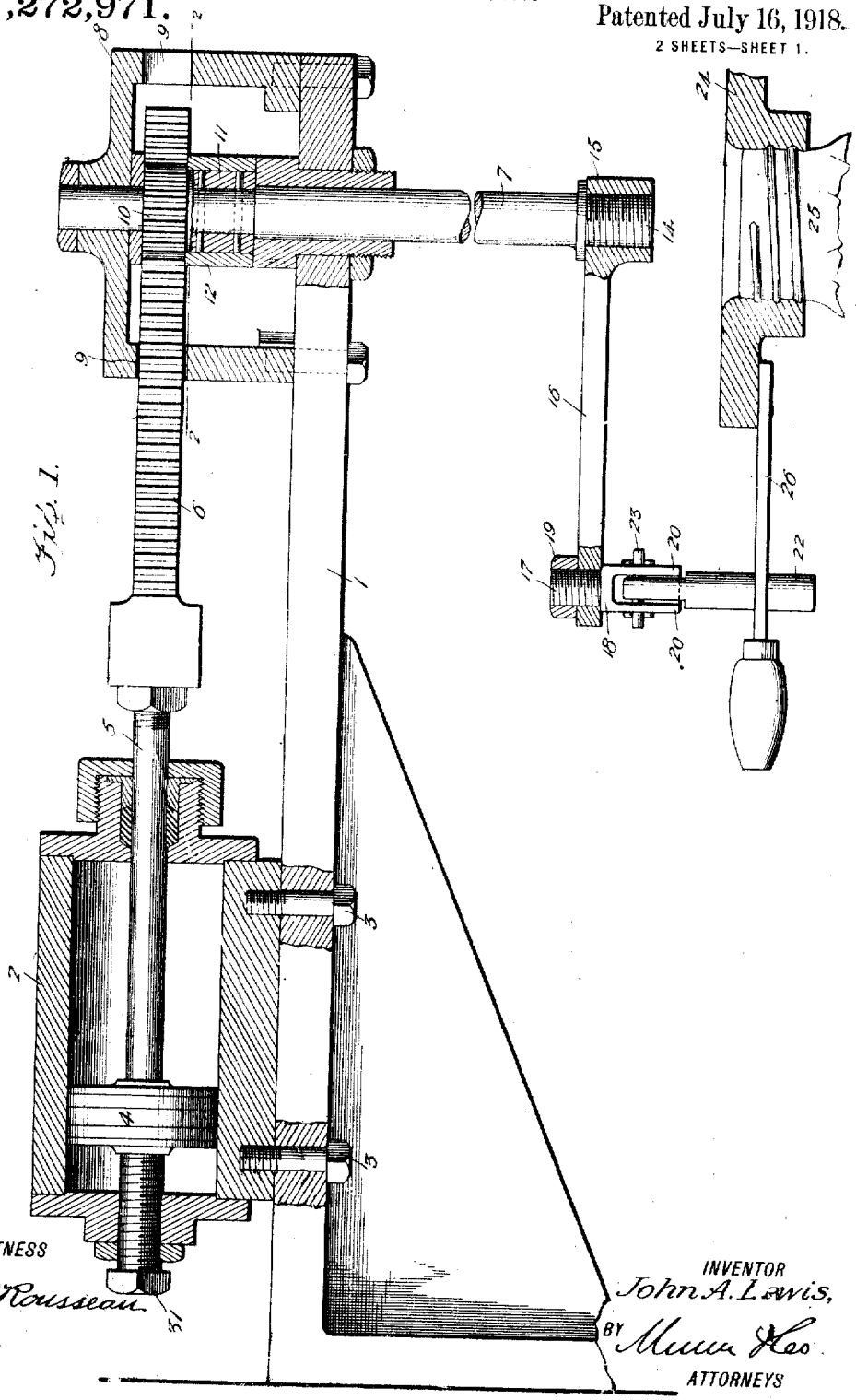
WITNESS
R. E. Rousseau
INVENTOR
John A. Lewis,
BY
Munn & Co.
ATTORNEYS J. A. LEWIS.
DEVICE FOR REMOVING RINGS FROM GLASSWARE.
APPLICATION FILED JAN. 9, 1918.
1,272,971.
Patented July 16, 1918.
2 SHEETS—SHEET 2.
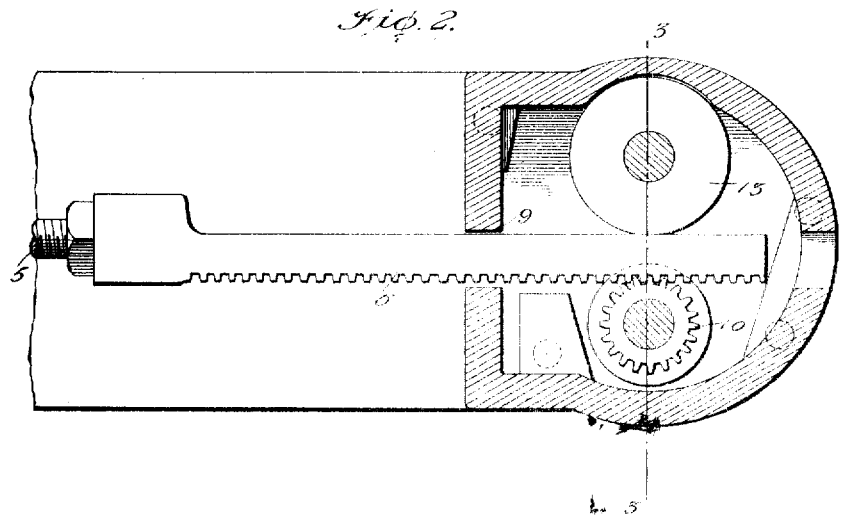
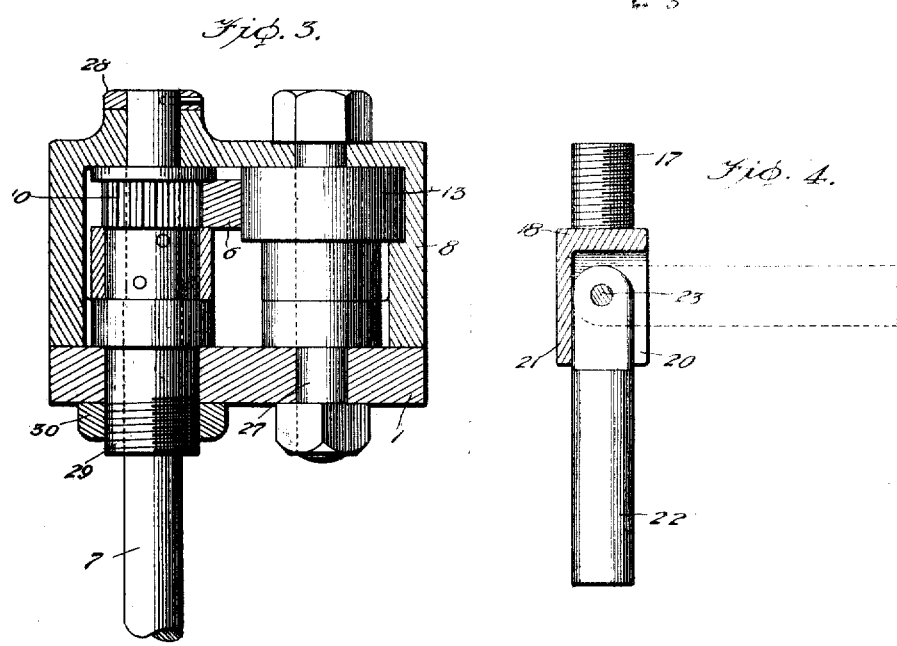
WITNESS
R. Rousseau.
INVENTOR
John A. Lewis,
BY
Munn & Co.
ATTORNEYS

UNITED STATES PATENT OFFICE.

JOHN ANDREW LEWIS, OF GRAFTON, WEST VIRGINIA, ASSIGNOR TO TYGART VALLEY GLASS COMPANY, OF GRAFTON, WEST VIRGINIA.

DEVICE FOR REMOVING RINGS FROM GLASSWARE.

1,272,971.  Specification of Letters Patent.  Patented July 16, 1918.

Application filed January 9, 1918. Serial No. 211,051.

*To all whom it may concern:*

Be it known that I, JOHN A. LEWIS, a citizen of the United States, and a resident of Grafton, in the county of Taylor and State of West Virginia, have invented certain new and useful Improvements in Devices for Removing Rings from Glassware, of which the following is a specification.

My invention is an improvement in devices for removing rings from glassware, and has for its object to provide mechanism for use in connection with glass making machinery for unscrewing the iron rings which are used in the formation of glassware for forming the screw threads at the top of the ware.

In the drawings:

Figure 1 is a vertical longitudinal section of the improved device;

Fig. 2 is a top plan view of the rack bar and its connections;

Fig. 3 is a vertical section on the line 3—3 of Fig. 2; and

Fig. 4 is a side view showing the knuckle joint connection between the removing finger and its support.

As is known, the rings which are adapted to be unscrewed by the present mechanism are mold attachments used for forming the screw thread on the tops of glassware, and in the usual practice of manufacturing glass a boy or man is provided for unscrewing this ring. The duty is very disagreeable on account of the excess heat and it is difficult for glass factories to keep the position filled.

In the usual manufacture of such articles, the form is transferred from the blank to the blow mold, and the ware is blown. At the next station after the blowing, the ring should be removed, and the present embodiment of the invention is mounted on a bracket or arm 1 which is just above the above mentioned station. A cylinder 2 is secured to the arm by means of screws 3, and within this cylinder moves a piston 4 which is connected by a piston rod 5 with a rack bar 6 which operates the unscrewing mechanism. The said mechanism comprises a shaft 7 which is journaled in vertical position in the arm 1 and in a casing 8, through which the rack bar 6 moves, the casing having openings 9 for permitting the passage of the rack bar.

The rack bar engages a pinion 10 on the shaft 7, and this pinion has a collar 11 below the pinion, provided with a ring 12 extending beyond the teeth of the pinion to support the rack bar. A roller 13 is journaled behind the rack bar to hold the same in contact with the pinion. At its lower end the shaft 7 has a threaded portion 14, and this threaded portion engages a hub 15 on an arm 16 extending radially from the shaft.

A threaded pin 17 connected with the body 18 of a yoke is threaded through the outer end of the arm, and is engaged by a nut 19 above the arm, and the arms 20 of the yoke are connected at one side edge by a web 21. A moving finger 22 is pivoted between the arms, as indicated at 23, and the web 21, it is evident, will limit the movement of the arm 22 in one direction with respect to the stem 17 to a position in alinement with the stem. The finger, however, may move freely in the opposite direction, as indicated in dotted lines in Fig. 4. The ring 24 which is to be unscrewed from the ware 25 has a radial arm 26 provided with a handle at its free end, and the arm 22 is adapted to engage this arm 26.

Referring to Fig. 3, it will be noticed that the roller 13 which engages the rear of the rack bar is mounted on a bolt 27 which is passed vertically through the casing 8 and is engaged by a nut below the casing. The shaft 7 has a stop collar 28 at its upper end, which is pinned to the shaft and limits its downward movement. At the under face of the arm 1 the shaft 7 has an enlarged threaded portion 29, which is engaged by a nut 30 to limit the upward motion of the arm. A set screw 31 is threaded through that head of the cylinder 2 remote from the rack bar 6, and this set screw engages the piston 4 to limit its movement away from the shaft 7.

In operation, at the moment that the ware 25 reaches the position shown in Fig. 1, air is admitted to the cylinder 2 at the end remote from the shaft 7, and the piston 4 is driven toward the set screw 31, the rack bar 6 sharing in this movement. This rotates the shaft 7 in a direction to cause the arm 16 to unscrew the ring 24, and the piston 4 is moved just far enough to cause the unscrewing movement. As the finger 22 returns, it swings upward over the arm 26, so that it does not move the same, that is, there is a rule joint connection between the arm 16 and the finger 22. The extent of movement of the piston 4 may be limited by the set screw 31 to the desired point to remove the ring 24.

It will be understood that compressed air is used for operating the cylinder in the present instance, because of the fact that compressed air is used to operate the blowing machine. It is obvious, however, that steam or any other motive fluid or electricity might be used.

I claim:

1. A device of the character specified, comprising a support, a shaft journaled in the support and provided at its lower end with a radial arm, a finger depending from the arm and connected thereto by a rule joint to permit the finger to swing freely in one direction from a vertical position, and to hold the finger in a vertical position when it swings in the other direction, power operated means for rotating the shaft, said means comprising a cylinder, a piston in the cylinder, a rack bar connected with the piston, the shaft having a pinion for engagement by the rack bar, and means for limiting the movement of the piston away from the shaft, said means being adjustable.

2. A device of the character specified, comprising a support, a shaft journaled in the support and provided at its lower end with a radial arm, a finger depending from the arm and connected thereto by a rule joint to permit the finger to swing freely in one direction from a vertical position, and to hold the finger in a vertical position when it swings in the other direction, power operated means for rotating the shaft, said means comprising a cylinder, a piston in the cylinder, and a rack bar connected with the piston, the shaft having a pinion for engagement by the rack bar.

3. A device of the character specified, comprising a support, a shaft journaled in the support and provided at its lower end with a radial arm, a finger depending from the arm and connected thereto by a rule joint to permit the finger to swing freely in one direction from a vertical position, and to hold the finger in a vertical position when it swings in the other direction, and power operated means for rotating the shaft.

JOHN ANDREW LEWIS.

Witnesses:
 LORENA PERINE,
 RALPH DIXON.